(12) United States Patent
Schmidt et al.

(10) Patent No.: US 6,546,554 B1
(45) Date of Patent: Apr. 8, 2003

(54) BROWSER-INDEPENDENT AND AUTOMATIC APPARATUS AND METHOD FOR RECEIVING, INSTALLING AND LAUNCHING APPLICATIONS FROM A BROWSER ON A CLIENT COMPUTER

(75) Inventors: Rene W. Schmidt, Palo Alto, CA (US); Hans E. Muller, Palo Alto, CA (US); Scott R. Violet, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/489,583

(22) Filed: Jan. 21, 2000

(51) Int. Cl.⁷ .............................................. G06F 9/445
(52) U.S. Cl. ...................... 717/176; 717/174; 717/177; 717/178; 717/121; 709/201; 709/203; 707/513; 345/749
(58) Field of Search ................................ 717/171, 172, 717/173, 174, 177, 178, 175, 176, 121, 148; 709/203, 201; 707/513; 345/744, 748, 749, 760, 738, 854

(56) References Cited

U.S. PATENT DOCUMENTS

| | | | | |
|---|---|---|---|---|
| 5,923,885 A | * | 7/1999 | Johnson et al. | 345/738 |
| 6,052,711 A | * | 4/2000 | Gish | 709/201 |
| 6,119,166 A | * | 9/2000 | Bergman et al. | 709/232 |
| 6,139,177 A | * | 10/2000 | Venkatraman et al. | 700/83 |
| 6,209,029 B1 | * | 3/2001 | Epstein et al. | 709/219 |
| 6,301,710 B1 | * | 10/2001 | Fujiwara | 707/10 |
| 6,324,578 B1 | * | 11/2001 | Cox et al. | 709/201 |
| 6,393,605 B1 | * | 5/2002 | Loomans | 717/121 |

FOREIGN PATENT DOCUMENTS

| | | |
|---|---|---|
| EP | 0 718 761 | 6/1996 |
| EP | 0 849 666 | 6/1998 |
| EP | 0 950 949 | 10/1999 |
| WO | WO 99/34286 | 7/1999 |

OTHER PUBLICATIONS

Title: BUS: a Browser Based User Interface Service for Web Based Applications, author: Sweeney et al, IEEE, 1999.*
Title: Designing Dexter-based hypermedia services for the World Wide Web, author: Gronbuck et al, ACM, 1997.*
Title: ALE Distributes Applications ICA and thin-client technology provide Web application publishing, May 1999, source: Google.*

* cited by examiner

*Primary Examiner*—Tuan Q. Dam
*Assistant Examiner*—Chameli C. Das
(74) *Attorney, Agent, or Firm*—Thelen Reid & Priest LLP; David B. Ritchie; John P. Schaub

(57) ABSTRACT

A browser-independent and automatic apparatus and method for receiving, installing, and launching applications from a browser is described. According to one embodiment, a helper application is registered with a browser for a specified file type. When the browser encounters a link to a metafile of the specified file type, the file is downloaded to the requesting system and the helper application is invoked to process the downloaded file. In the context of a Java™ implementation, the downloaded metafile comprises a short launch file specification for a Java™ application, and specifies a classpath as a set of Universal Resource Identifiers ("URIs"), a Java™ Runtime Environment ("JRE") version, security considerations, and other relevant information concerning the Java™ application to be executed. According to aspects of the present invention, automatic installation of Java™ archive files ("JAR files") and class files based on the URIs from which they are downloaded is implemented, automatic updates and versioning are supported without any central administration, and automatic installation of multiple JREs is facilitated. Embodiments of the present invention may also be used to facilitate other applications, such as launching Java™ applications directly from a browser without having to execute them within the browser, and to tie web contents to the appropriate corresponding viewer application.

57 Claims, 4 Drawing Sheets

BROWSER-INDEPENDENT AND AUTOMATIC APPARATUS AND METHOD FOR RECEIVING, INSTALLING AND LAUNCHING APPLICATIONS FROM A BROWSER ON A CLIENT COMPUTER

BACKGROUND OF THE INVENTION

1. Field of the Invention

The present invention relates to data communication networks and to software applications suitable for use in such networks. More particularly, the present invention relates to a browser-independent and automatic apparatus and method for receiving, installing, and launching applications from a browser on a client computer.

2. The Background Art

As is known to those skilled in the art, the Java™ language is an object-oriented language developed by Sun Microsystems, Inc. that can be integrated into conventional Hypertext Markup Language ("HTML") browsers, and which allows a document server to provide the browser with documents as well as with executable code. The executable code is automatically loaded from the document server if the HTML browser determines that it does not have the appropriate code already resident on the user machine.

Typically, the executable code takes the form of application programs known as "Applets," comprising "bytecodes" that are machine independent. These Applets are then interpreted by operating system specific applet interpreters (virtual machines). For example, a current Internet/Web browser implementation using the Java™ language is the HotJava™ browser, also developed by Sun Microsystems, Inc.

The platform-independent nature of Java™ class files allow developers to write a single version of their application, and then to deploy the application on a wide variety of different hardware and operating systems. Moreover, the Java™ platform implements a very advanced security model. According to this security model, a user can run untrusted Java™ applications and be certain that the integrity of his or her system and personal data is never compromised. For example, as is well known, a Java™ application may be run in a "sandbox" that prevents it from causing any harm or from gaining access to private information stored on a user's system or local network.

As mentioned above, currently, a common way of deploying Java™ applications across a network is by using Java™ Applets. Applets are typically downloaded and executed by a Java™-enabled web-browser, and make it possible to deploy Java™ software over the web with no installation needed by the user. Unfortunately, the use of Applets on the World Wide Web and on intranets has not yet been as popular as one would expect. This situation is primarily due to two factors: First, browser vendors have been hesitant to incorporate both the newest version and one or more earlier versions of the Java™ platform into their products. Second, not all applications fit well into a browser window, and this makes the Applet deployment model awkward to use.

Thus, what is needed is a technology that provides a "one-click" net-centric deployment model for software programs (such as Java™ applications) that is not browser-dependent. The apparatus and method that is described herein according to aspects of the present invention provides a browser-integrated, yet browser independent, solution that allows developers to use the latest Java™ technology in their applications, and to deploy them through any web browser, whether the browser is Java™-enabled or not. Furthermore, the present invention complements the Applet model by providing a solution for deploying an application in situations where the application's lifetime and/or screen real estate requirements renders the Applet approach impractical. Furthermore, the present invention can also be seen as an enabling technology for a wide variety of other technologies. These and other features and advantages of the present invention will be presented in more detail in the following specification of the invention and in the associated figures.

SUMMARY OF THE INVENTION

A browser-independent and automatic apparatus and method for receiving, installing, and launching applications from a browser is described. According to one embodiment, a helper application is registered with a browser for a specified file type. When the browser encounters a link to a metafile of the specified file type, the file is downloaded to the requesting system and the helper application is invoked to process the downloaded file. In the context of a Java™ implementation, the downloaded metafile comprises a short launch file specification for a Java™ application, and specifies a classpath as a set of Universal Resource Identifiers ("URIs"), a Java™ Runtime Environment ("JRE") version, security considerations, and other relevant information concerning the Java™ application to be executed. According to aspects of the present invention, automatic installation of Java™ archive files ("JAR files") and class files based on the URIs from which they are downloaded is implemented, automatic updates and versioning are supported without any central administration, and automatic installation of multiple JREs is facilitated. Embodiments of the present invention may also be used to facilitate other applications, such as launching Java™ applications directly from a browser without having to execute them within the browser, and to tie web contents to the appropriate corresponding viewer application.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

One embodiment of the present invention is described herein in the context of the Java™ programming language and the Java™ software paradigm. Those of ordinary skill in the art will realize that the following description of the present invention is illustrative only and not in any way limiting. Other embodiments of the invention will readily suggest themselves to such skilled persons having the benefit of this disclosure.

The present invention relates to an apparatus and method for receiving, installing, and launching software applications, such as Java™ applications, from any web-browser onto a client computer, without requiring the browser to implement the Java™ platform, and only requiring the user to perform a single "click" (or other equivalent user interface action). Reference will now be made in detail to an implementation of the present invention as illustrated in the accompanying drawings. The same reference numbers will be used throughout the drawings and the following description to refer to the same or like parts.

Figure 1:
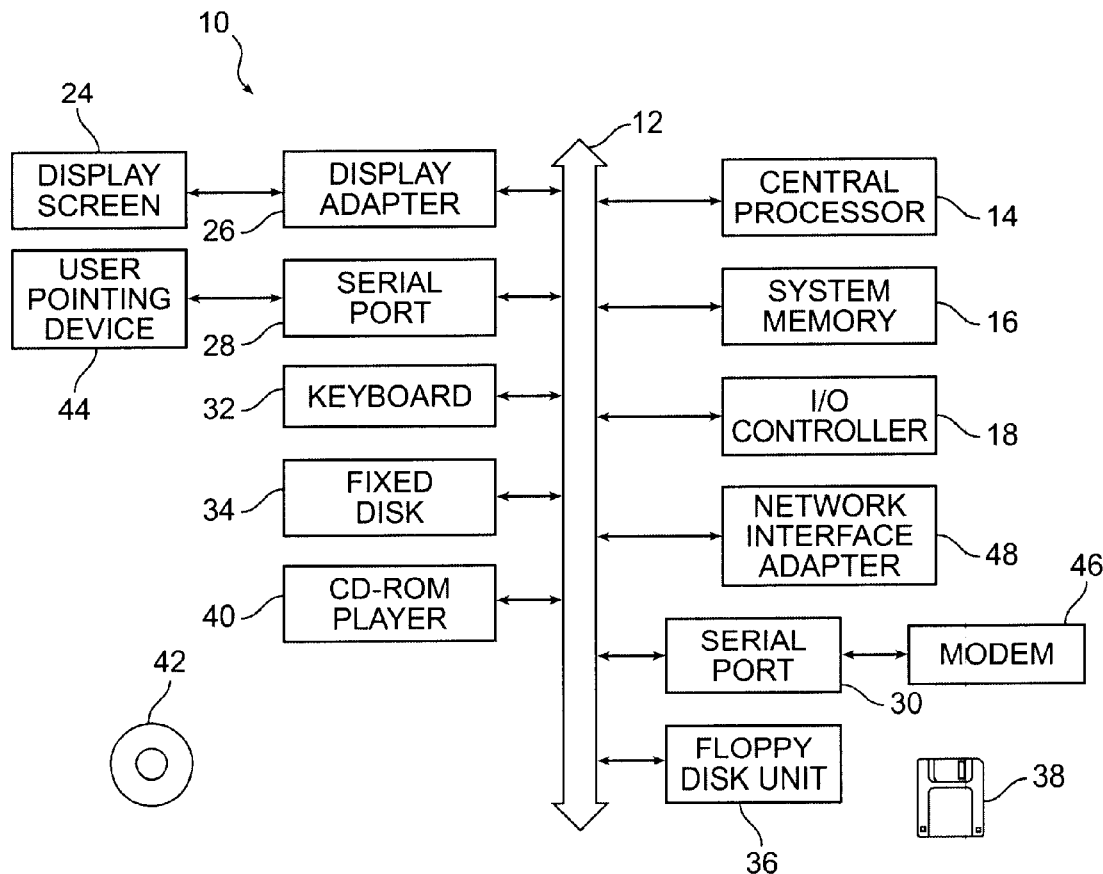
FIG. 1 depicts a block diagram of a client computer system suitable for implementing aspects of the present invention.

FIG. 1 depicts a block diagram of a client computer system 10 suitable for implementing aspects of the present invention. As shown in FIG. 1, client computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a fixed disk drive 34, a floppy disk drive 36 operative to receive a floppy disk 38, and a CD-ROM player 40 operative to receive a CD-ROM 42. Many other devices can be connected, such as a pointing device 44 (e.g., a mouse) connected via serial port 28 and a modem 46 connected via serial port 30. Modem 46 may provide a direct connection to a remote server via a telephone link or to the Internet via a POP (point of presence). Alternatively, a network interface adapter 48 may be used to interface to a local or wide area network using any network interface system known to those skilled in the art (e.g., Ethernet, DSL, AppleTalk™).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 16 or stored on storage media such as fixed disk 34 or floppy disk 38.

Figure 2:
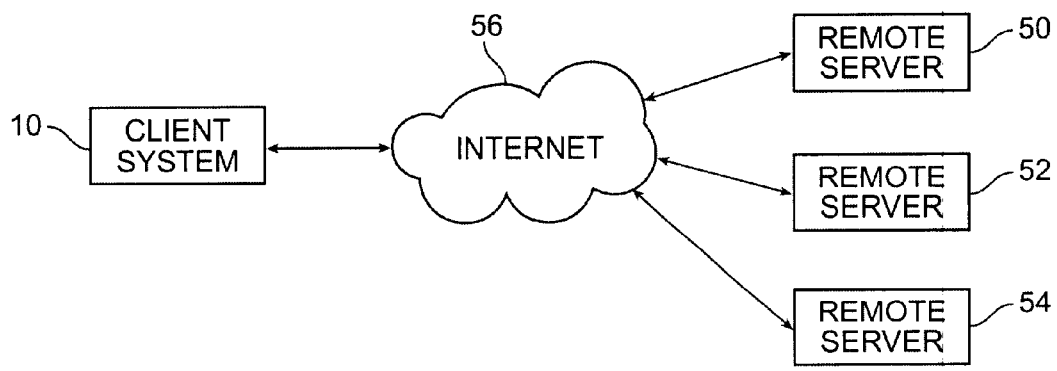
FIG. 2 depicts the interconnection of a client computer system to remote servers in accordance with aspects of the present invention.

FIG. 2 depicts the interconnection of client computer system 10 to remote servers 50, 52, and 54. FIG. 2 depicts a heterogeneous data communication network such as the Internet 56 interconnecting remote servers 50, 52, and 54. Modem 42 or some other network interface provides the connection from client computer system 10 to the Internet 56. Protocols for exchanging data via the Internet are well known and need not be discussed herein. Although FIG. 2 depicts the use of the Internet for exchanging data, the present invention is not limited to the Internet.

One well-known application of the Internet is the World Wide Web ("WWW") Remote servers 50, 52, and 54 may each provide access to a web site. To access WWW documents available on remote servers 50, 52, and 54, client computer system 10 typically operates a Hypertext Markup Language ("HTML") browser program. A commercially-available browser that may be used for this purpose is the HotJava™ browser, available from Sun Microsystems, Inc.

As is well-known to those skilled in the art, virtually all commercially available browsers (e.g., the HotJava™ browser mentioned above, Netscape™ Navigator™ Microsoft™ Internet Explorer™) are designed such that helper applications can be associated with the browser for given content-types (also known as "mime-types"). In the context of the present invention, the terms "content-type" and "mime-type" are used interchangeably unless noted otherwise. Those skilled in the art known that mime-types are part of an Internet standard that is used by the HyperText Transfer Protocol ("HTTP") to transfer information between computers across a network, such as client computer 10 and remote servers 50, 52, ad 54. Mime-types are organized into a hierarchical type/subtype structure (e.g., "text/plain," "text/html"), and are centrally administered by a specialized agency.

For each content-type (e.g., ".pdf," ".ps"), or equivalently, for each mime-type, the browser will search for an appropriate helper application to handle the given content-type (e.g., Adobe™ Acrobat™ for ".pdf" files, Ghostview™ for ".ps" files). Typically, the browser itself handles content-types such as 'text/html' (the mime-type for HTML documents).

Figure 3:
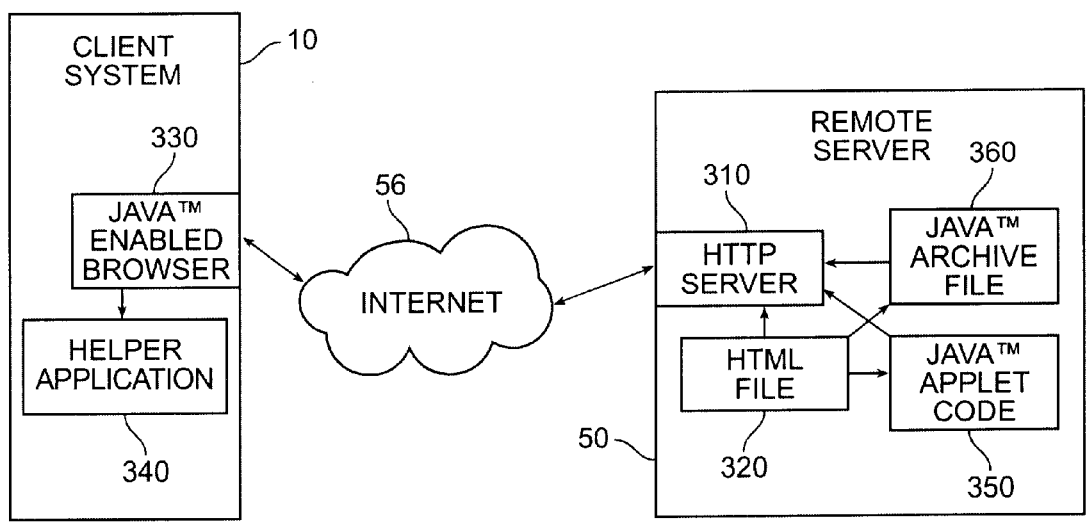
FIG. 3 depicts a block diagram of an applet model for net deployment of applications known to those skilled in the art.

FIG. 3 depicts a block diagram of an applet model for net deployment of applications known to those skilled in the art. As shown in FIG. 3, server 50 comprises a HyperText Transfer Protocol ("HTTP") server 310 capable of transferring files such as HTML file 320 to client computer 10 via Internet 56. At client computer 10, a browser 330 has been installed.

According to the Java™ Applet model known to those skilled in the art, browser 330 must be "Java™-enabled," meaning that it must include at least one version of the Java™ Runtime Environment ("JRE"). Helper applications 340 may also be installed on client computer 10. In the context of the present invention, a helper application is a stand-alone application that is invoked by a browser when a file of a specified file type is encountered by the browser. Typically, the helper application must be "registered" with the browser for a specified file type, so that the browser knows to invoke the correct helper application when the specified file type is encountered. For example, as mentioned earlier, those skilled in the art will recognize that the Adobe™ Acrobat™ Reader application is commonly associated with the ".pdf" file type. Unlike "plug-ins," helper applications typically execute as separate processes with respect to the browser.

Still referring to FIG. 3, according to the Applet model, HTML file 320, originally stored on the server computer 50, may include a link invoking a Java™ Applet 350. One such link may appear as follows within the HTML code comprising HTML file 320:

<APPLET code="SampleApplet.class" CODEBASE= "http://www.xyz.com/appletsdir/" HEIGHT=300 WIDTH=400></APPLET>

When Java™-enabled browser 330 encounters a link (also known as a "tag") such as the link shown above, it is able to download the specified applet (e.g., "SampleApplet") code from a location specified by the CODEBASE parameter (e.g., http://www.xyz.com/appletsdir/), and to then execute the applet within the browser environment. This is possible because, by definition, Java™-enabled browsers are capable of interpreting and executing Java™ Applets using a version of the JRE that forms part of the browser application. Typically, if a CODEBASE parameter is not provided, the Universal Resource Identifier ("URI") of the location where HTML file 320 was stored on server 50 is used. As is known to those skilled in the art, the "lifetime" of the specified applet is limited by the lifetime of the browser, and may terminate as soon as a user leaves the web page from which the applet was launched. It should also be noted that Applets are typically executed within browser windows, as the above link example clearly indicates (specifying the height and width of the applet window to be opened).

Those skilled in the art know that certain Java implementations also allow the specified applet "class" to be loaded from a Java Archive file (also called a ".jar file," or "JAR file") that is typically downloaded before the specified Java applet class is located. Archive files such as JAR files enable application or applet developers to include all the code and data files necessary to execute a given application or applet in a single compressed file, thereby providing enhanced download speeds and making it less complicated to distribute applications in networked environments. For example, the following HTML code may be used to specify an archive file:

<APPLET ARCHIVES="myarchive.jar" CODE= "SampleApplet.class"></APPLET>

When a Java™-enabled browser such as browser 330 shown in FIG. 3 encounters the above HTML code, it first downloads the "myarchive.jar" archive file 360 from server 50, then attempts to find the "SampleApplet.class" code within the downloaded "myarchive.jar" archive file 360. If the browser cannot locate the specified class in the archive file 360, it searches at the location specified by the CODEBASE parameter, as before. Specifying an archive file in an APPLET tag represents a performance optimization, instructing the browser to pre-load a specified archive and to use that archive, if possible, when locating classes comprising Java applet code. If the archive file 360 is not found, or if a required class file is not found within the specified archive, then the usual class location procedures described above may be used.

Figure 4:
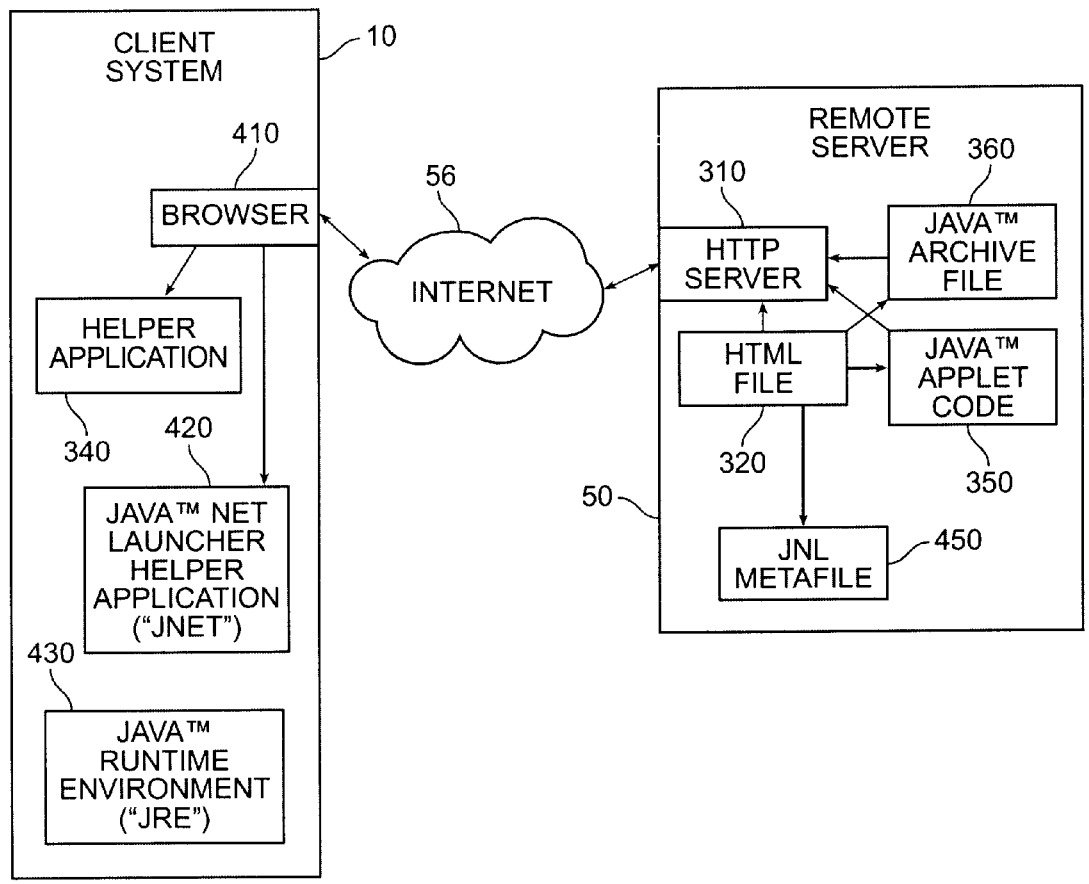
FIG. 4 illustrates a net deployment model for applications in accordance with aspects of the present invention.

FIG. 4 illustrates a net deployment model for applications in accordance with aspects of the present invention. As shown in FIG. 4, the Java™-enabled browser 330 of the Applet model shown in FIG. 3 has been replaced by a browser 410, which may or may not be Java™-enabled. The only requirement of browser 410 according to aspects of the present invention is that it must be capable of registering helper applications for specified mime-types or file types (i.e., a helper application must be invoked based on either the mime-type of the content that the browser is accessing or based on the file extension or other identifier associated with the file). As mentioned earlier, virtually all modern browsers support this requirement.

Still referring to FIG. 4, client computer 10 also comprises one or more JRE's 430. As will be discussed in more detail below, the presence of at least one JRE 430 in client computer 10 that is separate from any JRE's that may be incorporated into a Java™-enabled browser enables browser-independent execution of Java applications according to aspects of the present invention. As will be explained in more detail below, even if a JRE 430 has not been installed on client computer 10, the appropriate JRE may be automatically downloaded and installed according to aspects of the present invention.

Finally, in addition to other helper applications 340 which may have also been present in the Applet model, client computer 10 also comprises a new type of helper application, which is called a Java Net Launcher ("JNet") 420 in one embodiment of the resent invention. As will be discussed in more detail below, in one embodiment, the JNet helper application 420 is registered with browser 410 such that the JNet helper application 420 is invoked when browser 410 encounters a metafile having the new Java Net Launcher (".jnl," or "JNL") file format. In the context of the present invention, the term "metafile" refers to a file which describes or defines aspects or components of an application.

If multiple JRE's are installed on the client computer 10, the JNet helper application 420 can select the appropriate JRE 430 to use for a given application based on information provided in the JNL metafile. If the appropriate JRE has not been installed on the client computer 10, the JNet helper application 420 can automatically download and install the appropriate JRE from a trusted source.

In one embodiment, installation and configuration of the JNet helper application 420 can be performed with very little user interaction, because the JNet helper application 420 is designed to find the current proxy settings and related options from an already installed browser, and it searches the client system 10 to determine which JRE's if any, are installed. If no JRE's are found on the client system 10, the JNet helper application can be configured to automatically download and install the appropriate JRE or JRE's via Internet 56. Preferably, due to security considerations, any helper applications (including the JNet helper application) or JRE's that are downloaded onto client computer 10 should come from a trusted source and be delivered by trustworthy means (e.g., using encryption, password protection, code signing, etc.) to client computer 10.

The server 50 shown in FIG. 4 is also modified with respect to known techniques in accordance with aspects of the present invention. First, the HTTP server 310 of FIG. 3 has been configured to handle the new JNL metafile format, as discussed in more detail below. It should be noted that most commercially available HTTP servers are capable of being configured in this manner. Specifically, as is known to those skilled in the art, to enable the automatic launching of helper applications in a web-browser on the client computer, the web-server must provide the correct "mime-type" for the kind of file it is sending to the client. For example, as has already been mentioned, the mime-type provided for standard HTML files is 'text/html.' In one embodiment of the present invention, the mime-type for the new JNL metafiles is defined as 'application/java.' In this embodiment, the HTTP server 310 must be configured to send this mime-type along with the JNL metafiles themselves. For example, in the commercially-available Apache HTTP server known to those skilled in the art, this step simply involves adding the following line to the web server configuration (which is typically stored in the <apache-root>/conf/http.conf file):

AddType application/java jnl

This is the only change needed to be made to the HTTP server 310 to support the apparatus and methods according to the present invention. Alternatively (still using the Apache HTTP server as an example), a user can modify the mime-types file (stored by default at <apache-root>/conf/mime.types) to have the following line:

application/java jnl

As a final example (still using the Apache HTTP server as an example), if the HTTP server allows file overrides (this is a configuration option) the type of a given extension for the files in a particular directory can be specified by adding the following line to the .htaccess file in the directory containing the metafiles:

AddType application/java jnl

It should be noted that the first two options provided above typically require system administrator intervention, as these files are usually not editable by all users. In contrast, the third option is typically something that a user would be allowed to do. For example, if a user was unable to convince a system administrator to change the configuration files as described in the first two examples above, the user could typically still create the .htaccess file with the additional line shown above in the directory containing the metafiles. Other server configuration solutions for many other commercially available HTTP servers will be readily known to those skilled in the art, with each particular configuration solution being chosen according to the requirements of each implementation.

Still referring to FIG. 4, server 50 according to aspects of the present invention also comprises one or more metafiles 450 (called "JNL metafiles," or ".jnl metafiles," in one embodiment) which may be invoked by HTML file 320, in addition to Java applet code files 350 and Java archive files 360, which are also supported.

Thus, according to aspects of the present invention, a new content-type, or mime-type, is defined for Java™ applications (e.g., application/java). A link to such a content-type can be inserted anywhere within a web-page using standard HTML code, as in the following example:

<a href="http://www.mysite.com/myApp.jnl">Launch My App</a>

When a user clicks on a link such as the link listed above, the browser on the client computer will download the contents of the http://www.mysite.com/myApp.jnl metafile (which may be static text or automatically generated, depending on each implementation) into a local temporary file, and will then launch the JNet helper application with this local temporary file as an argument.

In the above example, the "myApp.jnl" file is a novel Java™ Network Launcher File ("JNL metafile") that contains information about how to launch the particular application requested. In particular, as will be described more fully in subsequent sections, JNL metafiles contain information concerning where to obtain the classes comprising a Java™ application (e.g., classpath, codebase, etc.), security information (e.g., whether the application should run in a secure sandbox), what version of the JRE the application expects to run on, and additional information primarily for display or informational purposes, such as the application name, vendor, or icon.

Figure 5:
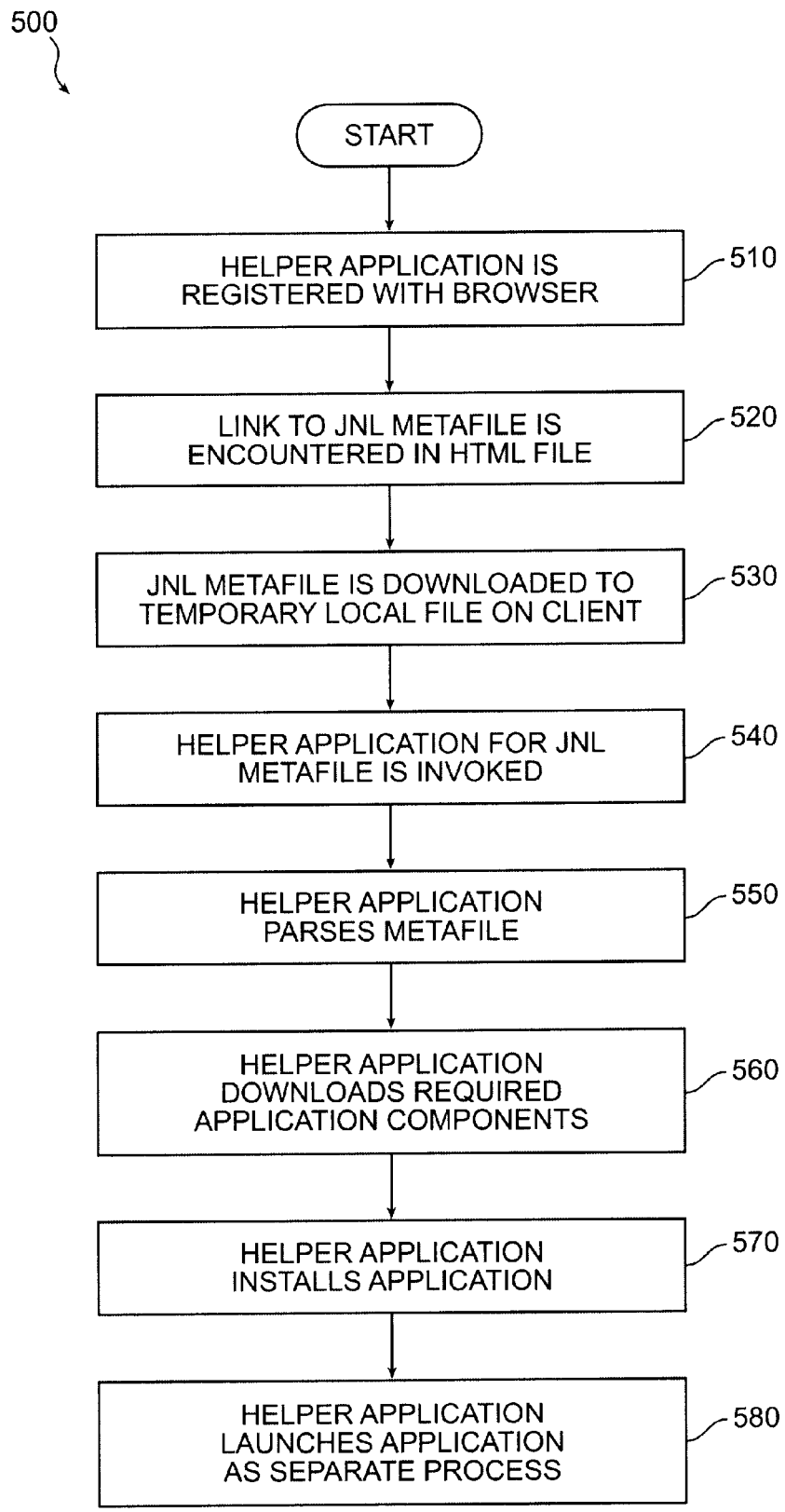
FIG. 5 is a flow chart illustrating a browser-independent method for receiving, installing, and launching applications from a browser in accordance with aspects of the present invention.

FIG. 5 is a flow chart illustrating a browser-independent method 500 for receiving, installing, and launching applications from a browser in accordance with aspects of the present invention. As shown in FIG. 5, at step 510, using any method known to those skilled in the art, the JNet helper application is registered with a browser on the client computer for the JNL file type (or, equivalently, for the "application/java" mime-type), such that the JNet helper application will be invoked when the browser encounters a link to a JNL metafile. In one embodiment, it is also assumed that before step 520 takes place, the JNet helper application has been installed on the client computer. At step 520, a link to a JNL metafile is encountered in a HTML file. When this happens, at step 530 a copy of the JNL metafile is downloaded to a local temporary file on the client computer, and at step 540 the JNet helper application is invoked by the browser, with the downloaded local temporary copy of the JNL metafile as an input parameter to the JNet helper application.

At step 550, the JNet helper application parses the JNL metafile to identify the components necessary to install and launch the application described in the JNL metafile. At step 560, the JNet helper application downloads any such components not already installed on the client computer to the client computer, preferably with as little user interaction required as possible. The components to be downloaded may include Java™ application code (i.e., class files), JAR files, JRE's, or any other components required to execute the requested application (e.g., data files, sound files, image files, etc.). As has already been mentioned, even if the appropriate JRE is not already installed on the client computer, the JNet helper application is capable of receiving and installing the appropriate JRE via the Internet or via an equivalent network. At step, 570, once all the components required to install and launch the requested application have been obtained, the JNet helper application installs the requested application on the client computer, once again preferably with as little user interaction required as possible. Finally, at step 580, the JNet helper application launches the requested application as a process that is separate from the browser process from which the JNet helper application had been invoked at step 540. Executing the requested application and the browser as separate processes isolates them from each other, such that a "crash" in one process will not affect the other.

In one embodiment, the entire application installation and launching process (i.e., steps 530, 540, 550, 560, 570 and 580) does not require any user interaction (assuming that the HTML file containing the link to a JNL metafile has already been invoked by any method known to those skilled in the art).

In one embodiment, the code for the Java™ application is pointed to by a classpath that consists of URIs. For example, a classpath could be specified in the JNL metafile as follows:

classpath=http://www.mysite.com/myApp.jar;http://www.mysite.com/classes

It should be noted that the URI name space is inherently immune to name space collision problems, since the URI name space is centrally administered and is designed to uniquely identify a file or similar resource anywhere on the Internet. The JNet helper application will automatically install the specified classes on the local machine using a directory structure based on these URIs. For example:

<installation-root>/http/80/www.mysite.com/myApp.jar

Thus, because the installation directory is selected based on the URI of the original location of the JNL metafile, no user input is required to decide where to install an application. Moreover, applications may also share JAR files if they both point to the same JAR file.

In one embodiment, each time an application is launched, the application can check to see if a newer version of the application exists on the web site from which it was originally downloaded. Thus, updates to an application can be automatically distributed to the client upon each invocation of the application. Different versions of an application are also supported through different naming of a URI, as in the following example:

classpath=http://www.mysite.com/myApp/1.0/myApp.jar
classpath=http://www.mysite.com/myApp/1.1/myApp.jar As shown in FIG. 5 and the associated disclosure, in one embodiment, the JNet helper application on the client computer is responsible for installing and launching the application. The process of launching an application is similar to executing a standard 'java' command (assuming a command line model), which command is well-known to those skilled in the art. For instance, for the previous example, the JNet helper application would execute the following equivalent java command:

java -classpath <installation-root>/http/80/
www.mysite.com/myApp.jar myApp

As is well-known to those skilled in the art, the 'java' command is typically used to invoke a JRE. It should be noted that in a windowed or Graphical User Interface based ("GUI-based") environment, a process equivalent to the execution of the "java" command from a command line would take place, but would typically not be visible to the user.

Depending on each particular implementation, several different JRE's may be registered with the JNet helper application. Thus, the JNet helper application can select the JRE version specified in the JNL metafile independently for each invocation of the JNet helper application. As mentioned earlier, if a JNL metafile specifies a version of the JRE that does not exist on the client computer (or even if there is no JRE installed at all on the client computer), the JNet application can automatically initiate a download and installation process of the proper version of the JRE onto the client computer. In one embodiment, the JNet helper application includes a JRE, such that when the JNet helper application is downloaded and installed on a client computer, a JRE is automatically downloaded and installed as part of the same process.

Architecture of the JNet Helper Application

Architecturally, the core part of the JNet helper application is the "jnet" command. This is the command that is executed by the browser when a JNL metafile is encountered in a HTML file (see step 520 of FIG. 5 and the associated discussion). The contents of a sample JNL metafile that could be used to launch a sample application named "SwingSet" is shown below (a full listing of the JNL metafile format is provided in the "JNL Metafile Format" section):

jnet.version=1.0
jnet.jre.version=1.2
jnet.classpath=http://javaweb.eng/-home/SwingSet.jar
jnet.mainclass=SwingSet Thus, the JNL metafile can be thought of as a standard Java™ platform properties file that contains all the information needed to launch a particular application. In the above example, the version of the JNet helper application to use is specified by the jnet.version parameter (e.g., version 1.0), the version of the Java™ Runtime Environment ("JRE") to use is specified by the jnet.jre.version parameter (e.g., version 1.2), the classpath to the actual application is specified by the jnet.classpath parameter (e.g., http://javaweb.eng/-home/SwingSet.jar), and the mainclass to execute is specified by the jnet.mainclass parameter (e.g., SwingSet). Those skilled in the art will realize that the file format presented above is simply an example, and that many variations are possible depending on the requirements of each particular implementation. The format of the JNL metafile is not critical, as long as the helper application on the client computer (e.g., the JNet helper application) is designed to parse and recognize the file format of the JNL metafile, whatever that may be.

The "jnet" command will parse the JNL metafile, check that the version specified in the JNL metafile is supported, and then launch the JRE specified, with instructions to launch the application given by the classpath and mainclass. The classpath and mainclass arguments are very similar to the arguments that are normally supplied to the java command known to those skilled in the art, except that with the JNet helper application, the classpath can be specified using URIs. Thus, the JNet helper application can be viewed as an enhanced, net-centric version of the java command. For example, the jnet command could also be invoked directly from the command line as follows:

jnet -classpath http://javaweb.eng/-home/SwingSet.jar
SwingSet

Figure 6:
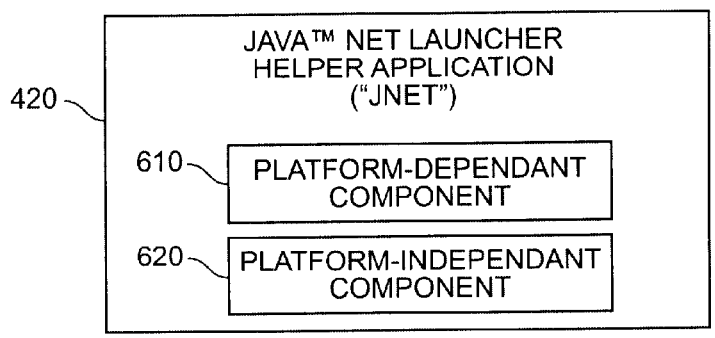
FIG. 6 depicts a block diagram illustrating the structure of a client-side net launcher helper application according to one embodiment of the present invention.

FIG. 6 depicts a block diagram illustrating the structure of a client-side net launcher helper application (i.e., the JNet helper application) according to one embodiment of the present invention. As shown in FIG. 6, the JNet helper application which interprets and executes the jnet command comprises two parts: a platform-dependent component 610, and a platform-independent component 620. The platform-dependent component 610 is a small executable program that performs an initial parsing of the JNL metafile to determine which JRE to use, and launches the appropriate version of the JRE using the java command. As has already been mentioned, if the appropriate JRE is not found on the client computer at the time that the jnet command is invoked (or if no JRE is installed at all), the JNet helper application automatically downloads and installs the appropriate version of the JRE from a trusted source using trustworthy means with as little user interaction required as possible.

In one embodiment, the platform-independent component 620 is written in the Java™ language, and parses the JNL metafile to find the classpath and various other attributes required to load and execute the given application. Furthermore, the platform-independent component 620 is also responsible for implementing and enforcing any security policies.

The JNL Metafile Format

In one embodiment, the relevant JNL metafile attributes supported by the JNet helper application are shown in Table 1, along with a brief description of each attribute. In this embodiment, the jnet.info attributes are all optional attributes that can be used to provide additional information about the application. The jnet.info.splashscreen can be used to quickly show a splash screen when a new application is loaded, without having to download any application code. This can provide a better user experience by providing almost instant feedback to the user.

The contents of the JNL metafile are made available by the JNet helper application to the executing Java™ application through the System.getProperty method. Thus, JNet-aware applications can use this mechanism to pass additional arguments to an application.

Table 1

The JNL Metafile Format

| Attribute | Description |
| --- | --- |
| jnet.version | Version of the JNet helper application that the JNL metafile expects |
| jnet.jre.version | Version of the Java ™: platform to use (e.g., 1.1.5 or 1.2) |
| jnet.vm.args | Arguments to the virtual machine (e.g., -mx64) |
| jnet.classpath | Classpath for requested application, described by URIs. |
| jnet.mainclass | Mainclass. If omitted, this could be found from a manifest file, as is known to those skilled in the art. |
| jnet.arguments | Argument string to the requested application |
| jnet.security | Determines whether the application should be sandboxed or not |
| jnet.info.title | Title of application |
| jnet.info.company | Origin of application |
| jnet.info.version | Version of the application |
| jnet.info.splashscreen | URI to a splash screen image |

Net Deployment

The browser-independent application launching technology according to aspects of the present invention is primarily concerned with "net deployment" of software applications, i.e., the deployment of applications across the web via any web browser, whether it is Java™-enabled or not. The key objectives of net deployment are universal access to applications from any web-browser, automatic installation of applications on client systems, and seamless upgrading to newer versions of applications on client systems.

For end-users, net deployment means that they can easily access any type of application simply by pointing their web-browser at a specific site. Thus, installation and version upgrades require no user interaction. Net deployment is an ideal way of distributing applications to all sorts of users, from novices to experts, on both the Internet and on private intranets.

This model can potentially provide significant cost-savings for large enterprises, since deployment of an application is centrally managed at the server end. For service providers (e.g., Internet Service Providers, or "ISPs"), this means that they can easily deploy custom-made applications to their users. This can help an ISP to provide better services, and to thereby distinguish themselves in the marketplace.

The above objectives form the core of net deployment, and they are, in fact, all fulfilled for solutions known to those skilled in the art, such as ActiveX™ components and Java™ Applets. However, there is a secondary set of objectives that are also highly desirable. The first of these objectives includes support for heterogeneous environments. The Internet is a heterogeneous environment by nature, and this is typically true for intranets in most enterprises as well. A second objective is to provide security against malicious code and protection of sensitive information. Finally, another objective is fast installation and reactivation of applications. Applications should install quickly, and preferably start even more quickly upon subsequent invocations by caching a local copy.

The security objective mentioned above is a very important one. Most current net deployment schemes implement security by providing the option of signing the code. Code signing is a technique that allows one to verify who wrote the code, and to verify that it has not been tampered with since it was signed. However, code signing does not really provide security, it merely lets one know who to blame if something goes wrong.

The Java™ platform supports code signing as well, but it goes further. It can provide security against both intentional and unintentional malicious code, by making it possible to restrict the access that a Java™ application has to a user's machine and local network. Many of the applications that are in use today are net-centric, so they do not need access to local stored data. Thus, this sort of restriction, or "sandboxing," of an application makes sense for these types of applications.

For example, if a user starts executing a stock-quote ticker application from xyztrade.com's web-site, in this case, the application only needs access to xyztrade.com's server to obtain the requested quotes. There is no need for such an application to access the data or file system on the user's local machine. By sandboxing such applications, a user can be certain about the integrity of his or her system, and that none of his or her potentially sensitive information is being compromised.

The Java™ Net Launcher Technology

The Java™ Net Launcher (JNet) technology according to aspects of the present invention can be described as a "player" for Java™ applications. Just as web users are accustomed to clicking on a link to a file with the extension ".rm" to launch the Real-Audio™ player, so can web users with the Java™ Net Launcher of the present invention installed click on a link to a .jnl metafile to launch a Java™ application.

As has been already discussed, the .jnl metafile is a relatively short file that describes how to launch a particular Java™ application (i.e., it contains information about the application's classpath, the main class, arguments, etc.). When a link to a .jnl metafile is encountered within HTML code, the .jnl metafile will be downloaded by the browser. Since the .jnl metafile is a file type that the browser does not natively understand, the browser will look for a helper application, and since the JNet helper application is registered with the browser to handle files with the .jnl extension (or, equivalently, the "application/java" mime-type), the browser will invoke the JNet helper application with the .jnl metafile as an argument. As mentioned earlier, this process is similar to current methods known in the art whereby Acrobat™ Reader or Ghostview™ are registered to handle .pdf and ps files, respectively. The JNet helper application then parses the .jnl metafile, and downloads and launches the Java™ application.

This simple model has many important benefits. First, it fulfills all of the primary objectives of net deployment described earlier. Once a Java™ platform and a JNet helper application are installed onto a client system, a user can easily deploy Java™ applications right from a web-browser by a single click.

Second, it fulfills all the secondary objectives of net deployment. The same security features that are applied to Java™ Applets when launched inside a browser can also be applied by JNet to the applications it launches. Furthermore, JNet can easily and securely cache applications on the local hard disk or other local storage medium for fast reactivation.

Third, one of the main benefits of the present invention is that it is browser independent. This means that Java™ technology can evolve independently of the browsers, and still be easily accessible through any browser. For enterprises and Internet Service Providers ("ISP's"), this means that they can develop services using the latest Java™ technology and be confident that it can be deployed on a wide variety of hardware, operating systems, and browsers.

Fourth, it can support multiple versions of the Java™ platform simultaneously. As discussed earlier, because a JNL metafile describes all the components necessary to download and install an application, it can specify which version of the Java™ platform a particular application needs. This makes it possible for enterprises and internet service providers to gradually adopt newer technology without sacrificing previous investments.

Fifth, the Java™ applications launched by the JNet helper application are not confined to displaying their graphical user interface ("GUI") within a browser window, and their lifetime is not restricted to the lifetime of a web-page, or even to the lifetime of the browser.

Sixth, most Java™ applications can execute unmodified using the JNet helper application. The JNet helper application is a launcher. It loads and executes an application in the same manner as the "java" command known to those skilled in the art. The only caveat is that the application must find resources using the classloader instead of relying on the file system. However, this is similar to the way Java™ Applets load resources, and many applications are already designed with this caveat in mind.

Seventh, the present invention can be implemented using virtually any HTTP server that is currently commercially available. Typically, only a minor configuration change needs to be made to the HTTP server so that it sends the correct mime-type for JNL metafiles to the browser on the client computer.

Finally, the JNet helper application can serve as an enabling technology for a number of related technologies and advanced features, as described in subsequent sections.

It is interesting to compare the JNet helper application model according to the present invention to the Applet model. As described above, the JNet helper application model provides the same number of benefits in terms of primary net deployment objectives as the Applet model. There is one extra step inherent to the JNet helper application model, in that the JNet helper application may need to be installed separately from the browser. However, this requirement is no different than with other plug-ins and helper application for current browsers. such as Acrobat™ Reader and Ghostview™. Therefore, the JNet helper application approach complements the Java™ Applet model in the sense that it provides a natural way of launching applications that do not fit into a web-page as easily as an Applet (e.g., an E-mail client).

It should also be noted that the JNet helper application model according to aspects of the present invention provides an opportunity to accelerate the adoption of the new Java™ platforms, since the present invention does not require application developers to wait for the major browser vendors to adopt such new platforms.

Figure 7:
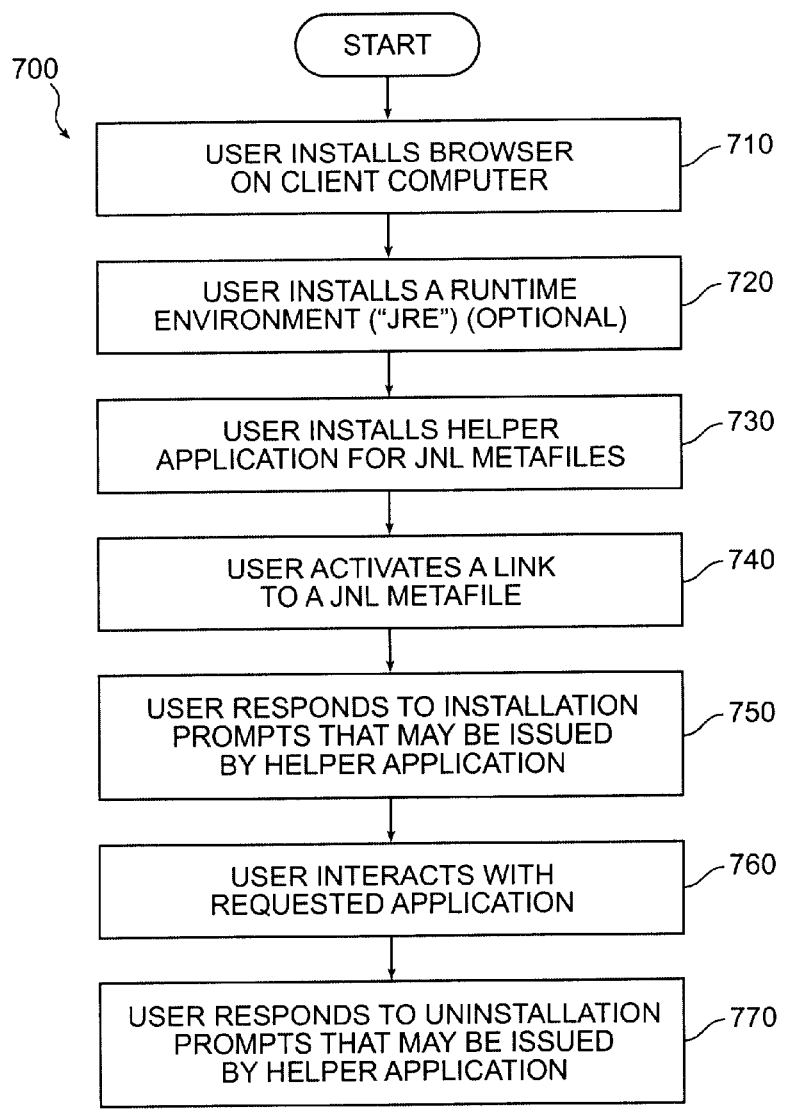
FIG. 7 is a flow chart illustrating a browser-independent method for receiving, installing, and launching applications from a user's perspective in accordance with one embodiment of the present invention.

FIG. 7 is a flow chart illustrating a browser-independent method for receiving, installing, and launching applications from a user's perspective in accordance with one embodiment of the present invention. As shown in FIG. 7, at step 710, a user installs a browser onto a client computer. As has already been mentioned, the only requirement for this browser according to the present invention is that it must be capable of registering helper applications for specified mime-types or file types. It should also be noted that such a browser may have already been installed on the client computer (e.g., it may have been bundled with the operating system or other software when the client computer was purchased). At step 720, the user installs one or more JRE's (e.g., by downloading them from the Internet or by installing them from a CD-ROM). Once again, one or more JRE's may have already been installed on the client computer, in which case step 720 is optional. Moreover, as has already been discussed, even if step 720 is not performed by the user, the JNet helper application can automatically download and install an appropriate JRE when it is requested by a JNL metafile.

Still referring to FIG. 7, at step 730, the user installs the JNet helper application. This step can be performed using any method known to those skilled in the art. For example, a user can download the JNet helper application by activating a link (e.g., "download JNet here") on a web page. Alternatively, the JNet helper application may be bundled with the browser that was installed at step 710, or it may be distributed on conventional storage media such as floppy disks or CD-ROMs. In one embodiment, the JNet helper application is bundled with a JRE, such that the process of installing the JNet helper application also results in the installation of a JRE. As part of the installation process of the JNet helper application, the browser installed at step 710 can be automatically reconfigured such that the JNet helper application is registered with the browser for files having the mime-type for JNL metafiles (e.g., "application/java").

At step 740, the user activates a link to a JNL metafile. Typically, this will happen when the user "clicks" on a link to a JNL file from an HTML file. At this point, the sequence of steps including steps 530 through 580 shown in FIG. 5 automatically begins. However, from the user's point of view, steps 530 through 580 are performed with very little user interaction. Still referring to FIG. 7, from the user's point of view, the next thing that happens is that at step 750, the user may be requested to respond to installation prompts issued by the JNet helper application. Preferably, these prompts are kept to a minimum, and in one embodiment, no installation prompts are issued at all, because the installation process proceeds completely automatically. However, depending on each particular implementation and user configuration, these prompts may include asking the user to select an installation directory, to select optional components for installation, to indicate acceptance of security notifications or warnings, or to indicate acceptance of license terms.

Once the application installation and launching process has completed, at step 760, the user interacts with the application once it has been launched. From a user perspective, the user may notice that the application will typically be displayed in a different window than the browser. Finally, when the application is terminated, at step 770, the user may be asked to respond to uninstallation prompts issued by the JNet helper application. For example, the user may be asked whether the application should be uninstalled or deleted from the client computer, or whether it should be cached on the client computer for subsequent use.

Implementation Examples

In the following section, two specific examples are provided, describing the sorts of possibilities that the Java™ Net Launcher technology according to aspects of the present invention provides. The first example describes how a portal site can provide more advanced services using Java™ technology, and the second example describes how data can be packaged along with its viewer application, eliminating the need for manually installing plug-ins and helper applications. Of course, many other implementation examples are possible within the spirit of the appended claims.

Enhanced Web Portal Services

The well-known "portal" web-sites, such as yahoo.com and the Netscape™ NetCenter™, are some of the best examples of the new push toward server-based computing. They typically provide a host of services, such as customized news, E-mail, calendar, address book, and instant messaging. Most of these services are delivered using the browser as the interface, although not all.

For example, instant messaging is often delivered using a separate client, which is typically only (or at least, initially) available for the Microsoft™ Windows™ platform. Using the JNet helper application according to aspects of the present invention, portal sites could provide this kind of service using the latest Java™-technology, and the service would be instantly available to all users on all major platforms. The present invention also eliminates the installation step that is typically required when dealing with native applications.

Services provided from a portal site are typically server-based, and therefore do not require access to local data on the client system. Thus, they can be sandboxed using the built-in security features of the Java™ platform. In this way, the end-user can be confident that the applications are not compromising the integrity of his or her systems.

Another set of features that portal sites could deliver through custom applications using aspects of the present invention are tools for off-line access to the personal data stored with the portal, such as E-mail messages, address book entries, and appointments. Using the JNet helper application, these applications could be automatically downloaded and installed while a user is on-line, and could still be available off-line by caching the applications on the local disk.

Combining Data and Presentation

Another interesting way of using the JNet helper application technology is to eliminate the need for downloading and installing helper applications for web browsers. For example, currently, when a user clicks on an Acrobat™ file (.pdf), then it can only be viewed from a browser if the Acrobat™ Reader is installed and if the browser has been configured to launch the Acrobat™ Reader for .pdf files. If the Acrobat™ Reader application is not installed on a user's local machine, it must typically be manually downloaded from a web-site and installed on the user's system.

However, this manual installation step for helper applications can be eliminated according to aspects of the present invention. For example, instead of putting a .pdf file on the web-site, a link to a .jnl metafile (described earlier) could be provided. This .jnl metafile will contain a reference to the viewer application (e.g., Acrobat™ Reader for Java™), and the .jnl metafile will also contain the arguments to the viewer application that causes it to launch and to open the particular document being requested.

Thus, the above example describes a way of packaging data with its corresponding viewer application. According to these aspects of the present invention, a web developer can create a file format tailored for a wide variety of new services, and can easily distribute these services without having to develop new file extensions or mime-types, and without requiring users to download viewer software independently.

Advanced Features

The previous sections have described the main features of net-deployment and the Java™ Net Launcher technology according to aspects of the present invention itself. In this section, a number of more advanced features that are possible and which fit well with the Java™ Net Launcher technology are described.

Caching and installation of Java™ applications: The JNet helper application architecture can easily support caching of Java™ application on the local system. Furthermore, an application that has been cached locally can also be made available for off-line users. Thus, the JNet helper application architecture can also work as a net-centric installer for Java™ applications. The JNet helper application can also be configured to delete temporary installation files, either automatically or at the user's discretion. If so desired for a particular implementation, the JNet helper application can also be configured to uninstall an application once it has finished executing (or after some specified time interval) so that memory space can be freed up on the client computer's memory storage devices.

Security profiles and code signing: As described in this report, the JNet helper application architecture supports the sandboxing mechanism that has been developed for Java™ Applets. However, it is easy to imagine more sophisticated security models based on techniques known to those skilled in the art that allow users to grant more privileges to a Java™ application. For example, an application could be allowed to use part of the file system as a cache, or to have access to stored local-state in a manner similar to browser cookies. Also, code signing can be supported, so that users can verify the origins of an application.

Launching of Applets: The present discussion has solely focused on launching of Java™ applications. However, the JNet helper application could easily support launching of Java™ Applets as well. This could be relevant on platforms where there is limited or no browser-support for Java™ Applets.

Reducing footprint and startup time: The JNet helper application makes it likely that users will launch many client applications from a web-browser. The footprint and start-up time required per application therefore becomes a major issue for client-side Java™ applications. Therefore, the JNet helper application can be viewed as an enabling-technology for both classfile streaming and the lightweight Java™ Virtual Machine architectures, both known to those skilled in the art. Streaming of class files allow class-files to be transferred in a more compact representation, and can support partially and background loading of classes. It is probably not unrealistic to expect at least a ten-fold compression rate compared to current JAR files. Streaming techniques can significantly reduce start-up time because fewer bytes need to be transferred across the net, and can also reduce footprint because fewer methods need to be loaded. For example, for the SwingSet application described earlier, most of the footprint is used for storage of the bytecodes in methods, and in a typical run of the SwingSet application less than 50% of the methods are used. Thus, reducing the number of loaded methods can significantly reduce footprint size. Moreover, "Lightweight" Java™ Virtual Machines, designed to allow sharing of data-structures between different Java™ applications running on the same system, such as class-files and compiled code, can be used along with the present invention. This can significantly reduce the total footprint if several Java™ applications are executing concurrently, and also increase start-up time, since most of the set-up cost for an application can be eliminated by sharing data structures with already running Java™ applications.

Finally, the present invention can be used concurrently with known systems and techniques. For example, the incremental software update mechanisms of the Castanet technology, commercially available from Marimba, Inc., may be used along with the apparatus and method of the present invention to further facilitate the net deployment of version updates to Java™ or other applications. In this sense, the Castanet technology is an orthogonal concept.

In summary, the JNet helper application technology according to aspects of the present invention provides a simple model for one-click net-centric deployment of Java™ applications across the heterogeneous networks such as the Internet. It provides a model for deploying browser-independent Java™-applications across heterogeneous networks, and it breaks the current tie-in with browsers that can limited the adoption of new software platforms.

The ability to launch Java™ applications directly from a browser, without having to run them inside the browser, provides a much more natural way of launching applications such as E-mail clients or integrated programming environments than does the Applet model. As described in the examples discussed above, the present invention also makes it possible to tie web contents to the appropriate viewer application, thereby making the user experience both simpler and richer. In this way, the "application/java" mime-type according to aspects of the present invention can be viewed as the ultimate mime-type.

Another benefit of the present invention is to make Java™-technology adoption independent of the major browser-vendors. To this end, the present invention is both browser-independent and JRE-independent. These features make the technology very robust, because there is a clear separation between its components. The browser does not interfere with the Java™ applications, and the JNet helper application itself does not re-implement functionality that is present in either the browser or the JRE itself. The Java™ Net Launcher removes one of the major obstacles to widespread adoption of the Java™ platform on the Internet, and has the potential to enrich a user's web experience by providing the deployment mechanism for a whole new set of Java™-technology based services.

The block diagrams and flowcharts described herein are illustrative of merely the broad architectures and logical flow of steps to achieve a method of the present invention and that steps may be added to, or taken away from, a flowchart without departing from the scope of the invention. Further, the order of execution of steps in the flowcharts may be changed without departing from the scope of the invention. Additional considerations in implementing the method described by a flowchart may dictate changes in the selection and order of steps.

In general, the flowcharts in this specification include one or more steps performed by software routines executing in a computer system. The routines may be implemented by any means known in the art. For example, any number of computer programming languages, such as the Java™ language, C, C++, Pascal, Smalltalk, FORTRAN, assembly language, etc., may be used. Further, various programming approaches such as procedural, object oriented or artificial intelligence techniques may be employed. It should be noted, however, that the platform independent code should be written in a programming language especially suitable for platform independent applications, such as the Java™ language or Smalltalk. As known to those skilled in the art, the program code corresponding to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A browser-independent method for receiving, installing and launching an application from a browser on a client computer, comprising:

registering a helper application with a browser on said client computer for a specified file type, wherein said helper application is invoked when said browser encounters a link to a metafile of said specified file type;

receiving a copy of said metafile at said client computer and invoking said helper application using a copy of said metafile as an input parameter when said browser encounters a link to said metafile;

parsing a copy of said metafile to determine the components necessary to install and launch said application;

receiving a copy of any of said components not already installed on said client computer at said client computer;

installing said application on said client computer; and launching said application independently of said browser.

2. The method according to claim 1, wherein said application is a java application and said metafile comprises a short launch file specification for said java application.

3. The method according to claim 2, wherein said metafile specifies a classpath as a set of Universal Resource Identifiers ("URIs"), a Java Runtime Environment ("JRE") version, and security information concerning said java application.

4. The method according to claim 3, further comprising automatic installation of java archive files and class files based on the Universal Resource Identifiers ("URIs") from which said java archive files and class files are received.

5. The method according to claim 3, wherein said application can be automatically updated to a newer version.

6. The method according to claim 3, further comprising automatic installation of a JRE if said JRE is specified by said metafile and said JRE is not installed on said client computer.

7. A browser-independent method for receiving, installing and launching an application from a browser on a client computer, comprising:

installing a browser capable of registering helper applications for specified mime-types or file types on said client computer;

installing one or more runtime environments for said application on said client computer;

installing a helper application capable of parsing a metafile describing the components necessary to install and execute said application on said client computer;

activating a link to said metafile;

receiving a copy of said metafile at said client computer and invoking said helper application using a copy of said metafile as an input parameter;

parsing a copy of said metafile to determine the components necessary to install and launch said application;

receiving a copy of any of said components not already installed on said client computer at said client computer;

installing said application on said client computer; and launching said application independently of said browser.

8. The method according to claim 7, wherein said application is a java application and said metafile comprises a short launch file specification for said java application.

9. The method according to claim 7, wherein said metafile specifies a classpath as a set of Universal Resource Identifiers ("URIs"), a Java Runtime Environment ("JRE") version, and security information concerning said java application.

10. The method according to claim 9, further comprising automatic installation of java archive files and class files based on the Universal Resource Identifiers ("URIs") from which said java archive files and class files are received.

11. The method according to claim 9, wherein said application can be automatically updated to a newer version.

12. The method according to claim 9, further comprising automatic installation of a JRE if said JRE is specified by said metafile and said JRE is not installed on said client computer.

13. A browser-independent method for receiving and installing a runtime environment from a browser on a client computer, comprising:

registering a helper application with a browser on said client computer for a specified file type, wherein said helper application is invoked when said browser encounters a link to a metafile of said specified file type;

receiving a copy of said metafile at said client computer and invoking said helper application using a copy of said metafile as an input parameter when said browser encounters a link to said metafile;

parsing a copy of said metafile to determine whether said runtime environment is necessary to launch said application; and receiving and installing said runtime environment at said client computer if said runtime environment is determined to be necessary to launch said application and said runtime environment is not already installed on said client computer.

14. The method according to claim 13, wherein said runtime environment is a Java Runtime Environment ("JRE").

15. The method according to claim 13, wherein said runtime environment can be automatically updated to a newer version.

16. The method according to claim 13, wherein said runtime environment is received at said client computer from a trusted source.

17. The method according to claim 13, wherein said runtime environment is received at said client computer from a trusted source using trustworthy means.

18. A browser-independent method for transmitting an application to a client computer, comprising:

configuring a HTTP server to transmit a specified mime-type when a metafile describing the components necessary to install and launch said application is transmitted by said HTTP server to said client computer; and transmitting said metafile having said mime-type to said client computer in response to a HTTP request received from said client computer; and transmitting some or all of said components to said client computer in response to one or more requests received from said client computer.

19. The method according to claim 18, wherein said application is a java application and said metafile comprises a short launch file specification for said java application.

20. The method according to claim 18, wherein said metafile specifies a classpath as a set of Universal Resource Identifiers ("URIs"), a Java Runtime Environment ("JRE") version, and security information concerning said java application.

21. A browser-independent apparatus for receiving, installing and launching an application from a browser on a client computer, comprising:

means for registering a helper application with a browser on said client computer for a specified file type, wherein said helper application is invoked when said browser encounters a link to a metafile of said specified file type;

means for receiving a copy of said metafile at said client computer and invoking said helper application using a copy of said metafile as an input parameter when said browser encounters a link to said metafile;

means for parsing a copy of said metafile to determine the components necessary to install and launch said application;

means for receiving a copy of any of said components not already installed on said client computer at said client computer;

means for installing said application on said client computer; and means for launching said application independently of said browser.

22. The apparatus according to claim 21, wherein said application is a java application and said metafile comprises a short launch file specification for said java application.

23. The apparatus according to claim 22, wherein said metafile specifies a classpath as a set of Universal Resource Identifiers ("URIs"), a Java Runtime Environment ("JRE") version, and security information concerning said java application.

24. The apparatus according to claim 23, further comprising automatic installation of java archive files and class files based on the Universal Resource Identifiers ("URIs") from which said java archive files and class files are received.

25. The apparatus according to claim 23, wherein said application can be automatically updated to a newer version.

26. The apparatus according to claim 23, further comprising means for automatic installation of a JRE if said JRE is specified by said metafile and said JRE is not installed on said client computer.

27. A browser-independent apparatus for receiving, installing and launching an application from a browser on a client computer, comprising:

means for installing a browser capable of registering helper applications for specified mime-types or file types on said client computer;

means for installing one or more runtime environments for said application on said client computer;

means for installing a helper application capable of parsing a metafile describing the components necessary to install and execute said application on said client computer;

means for activating a link to said metafile;

means for receiving a copy of said metafile at said client computer and invoking said helper application using a copy of said metafile as an input parameter;

means for parsing a copy of said metafile to determine the components necessary to install and launch said application;

means for receiving a copy of any of said components not already installed on said client computer at said client computer;

means for installing said application on said client computer; and means for launching said application independently of said browser.

28. The apparatus according to claim 27, wherein said application is a java application and said metafile comprises a short launch file specification for said java application.

29. The apparatus according to claim 27, wherein said metafile specifies a classpath as a set of Universal Resource Identifiers ("URIs"), a Java Runtime Environment ("JRE") version, and security information concerning said java application.

30. The apparatus according to claim 29, further comprising automatic installation of java archive files and class files based on the Universal Resource Identifiers ("URIs") from which said java archive files and class files are received.

31. The apparatus according to claim 29, wherein said application can be automatically updated to a newer version.

32. The apparatus according to claim 29, further comprising means for automatic installation of a JRE if said JRE is specified by said metafile and said JRE is not installed on said client computer.

33. A browser-independent apparatus for receiving and installing a runtime environment from a browser on a client computer, comprising:

means for registering a helper application with a browser on said client computer for a specified file type, wherein said helper application is invoked when said browser encounters a link to a metafile of said specified file type;

means for receiving a copy of said metafile at said client computer and invoking said helper application using a copy of said metafile as an input parameter when said browser encounters a link to said metafile;

means for parsing a copy of said metafile to determine whether said runtime environment is necessary to launch said application; and means for receiving and installing said runtime environment at said client computer if said runtime environment is determined to be necessary to launch said application and said runtime environment is not already installed on said client computer.

34. The apparatus according to claim 33, wherein said runtime environment is a Java Runtime Environment ("JRE").

35. The apparatus according to claim 33, wherein said runtime environment can be automatically updated to a newer version.

36. The apparatus according to claim 33, wherein said runtime environment is received at said client computer from a trusted source.

37. The apparatus according to claim 33, wherein said runtime environment is received at said client computer from a trusted source using trustworthy means.

38. A browser-independent apparatus for transmitting an application to a client computer, comprising:

means for configuring a HTTP server to transmit a specified mime-type when a metafile describing the components necessary to install and launch said application is transmitted by said HTTP server to said client computer; and means for transmitting said metafile having said mime-type to said client computer in response to a HTTP request received from said client computer; and means for transmitting some or all of said components to said client computer in response to one or more requests received from said client computer.

39. The apparatus according to claim 38, wherein said application is a java application and said metafile comprises a short launch file specification for said java application.

40. The apparatus according to claim 38, wherein said metafile specifies a classpath as a set of Universal Resource Identifiers ("URIs"), a Java Runtime Environment ("JRE") version, and security information concerning said java application.

41. A browser-independent apparatus for receiving, installing and launching an application from a browser on a client computer, comprising:

a runtime environment for said application; and a helper application that is invoked by a browser when said browser encounters a link to a metafile describing the components necessary to install and launch said application, wherein said helper application comprises logic for parsing a copy of said metafile to determine the components necessary to install and launch said application, logic for obtaining a copy of any of said components not already installed on said client computer, logic for installing said application on said client computer, and logic for launching said application independently of said browser.

42. The apparatus according to claim 41, wherein said application is a java application, said runtime environment is a Java Runtime Environment ("JRE"), and said metafile comprises a short launch file specification for said java application.

43. The apparatus according to claim 42, wherein said metafile specifies a classpath as a set of Universal Resource Identifiers ("URIs"), a Java Runtime Environment ("JRE") version, and security information concerning said java application.

44. The apparatus according to claim 43, wherein said helper application further comprises logic for automatic installation of java archive files and class files based on the Universal Resource Identifiers ("URIs") from which said java archive files and class files are obtained.

45. The apparatus according to claim 43, wherein said helper application further comprises logic for automatically updating said application to a newer version.

46. The apparatus according to claim 43, wherein said helper application further comprises logic for automatically installing a JRE if said JRE is specified by said metafile and said JRE is not installed on said client computer.

47. A browser-independent apparatus for receiving and installing a runtime environment from a browser on a client computer, comprising:

a helper application that is invoked by a browser when said browser encounters a link to a metafile describing the components necessary to install and launch an application dependent on said runtime environment, wherein said helper application comprises logic for parsing a copy of said metafile to determine which version of said runtime environment is specified, logic for determining whether said version of said runtime environment is installed on said client computer, logic for obtaining a copy of said version of said runtime environment if said version of said runtime environment is not already installed on said client computer, and logic for installing said version of said runtime environment on said client computer independently of said browser.

48. The apparatus according to claim 47, wherein said runtime environment is a Java Runtime Environment ("JRE").

49. The apparatus according to claim 47, wherein said helper application further comprises logic for automatically updating said runtime environment to a newer version.

50. The apparatus according to claim 47, wherein said helper application further comprises logic for obtaining said runtime environment from a trusted source using trustworthy means.

51. A browser-independent apparatus for transmitting an application to a client computer, comprising:

a HTTP server configured to transmit a specified mime-type when a metafile describing the components necessary to install and launch said application is transmitted by said HTTP server to said client computer; and a metafile having said mime-type, wherein said metafile is transmitted by said HTTP server to said client computer in response to a HTTP request received from said client computer.

52. The apparatus according to claim 51, wherein said application is a java application and said metafile comprises a short launch file specification for said java application.

53. The apparatus according to claim 52, wherein said metafile specifies a classpath as a set of Universal Resource Identifiers ("URIs"), a Java Runtime Environment ("JRE") version, and security information concerning said java application.

54. A program storage device readable by a machine, tangibly embodying a program of instructions executable by the machine to perform a browser-independent method for receiving, installing and launching an application from a browser on a client computer, the method comprising:

registering a helper application with a browser on said client computer for a specified file type, wherein said helper application is invoked when said browser encounters a link to a metafile of said specified file type;

receiving a copy of said metafile at said client computer and invoking said helper application using a copy of said metafile as an input parameter when said browser encounters a link to said metafile;

parsing a copy of said metafile to determine the components necessary to install and launch said application;

receiving a copy of any of said components not already installed on said client computer at said client computer;

installing said application on said client computer; and launching said application independently of said browser.

55. A program storage device readable by a machine, tangibly embodying a program of instructions executable by the machine to perform a browser-independent method for receiving, installing and launching an application from a browser on a client computer, the method comprising:

installing a browser capable of registering helper applications for specified mime-types or file types on said client computer;

installing one or more runtime environments for said application on said client computer;

installing a helper application capable of parsing a metafile describing the components necessary to install and execute said application on said client computer;

activating a link to said metafile;

receiving a copy of said metafile at said client computer and invoking said helper application using a copy of said metafile as an input parameter;

parsing a copy of said metafile to determine the components necessary to install and launch said application;

receiving a copy of any of said components not already installed on said client computer at said client computer;

installing said application on said client computer; and launching said application independently of said browser.

56. A program storage device readable by a machine, tangibly embodying a program of instructions executable by the machine to perform a browser-independent method for receiving and installing a runtime environment from a browser on a client computer, the method comprising:

registering a helper application with a browser on said client computer for a specified file type, wherein said helper application is invoked when said browser encounters a link to a metafile of said specified file type;

receiving a copy of said metafile at said client computer and invoking said helper application using a copy of said metafile as an input parameter when said browser encounters a link to said metafile;

parsing a copy of said metafile to determine whether said runtime environment is necessary to launch said application; and receiving and installing said runtime environment at said client computer if said runtime environment is determined to be necessary to launch said application and said runtime environment is not already installed on said client computer.

57. A program storage device readable by a machine, tangibly embodying a program of instructions executable by the machine to perform a browser-independent method for transmitting an application to a client computer, the method comprising:

configuring a HTTP server to transmit a specified mime-type when a metafile describing the components necessary to install and launch said application is transmitted by said HTTP server to said client computer; and transmitting said metafile having said mime-type to said client computer in response to a HTTP request received from said client computer; and transmitting some or all of said components to said client computer in response to one or more requests received from said client computer.

* * * * *

UNITED STATES PATENT AND TRADEMARK OFFICE
CERTIFICATE OF CORRECTION

PATENT NO.   : 6,546,554 B1                                             Page 1 of 1
DATED        : April 8, 2003
INVENTOR(S)  : Rene W. Schmidt, Hans E. Muller and Scott R. Violet It is certified that error appears in the above-identified patent and that said Letters Patent is hereby corrected as shown below:

Column 5,
Line 26, delete "</APPLET>" and replace with -- ...</APPLET > --.
Line 27, insert:
      -- ...
      </APPLET> --.

Column 6,
Line 3, delete "resent" and replace with -- present --.

Signed and Sealed this

Fifteenth Day of July, 2003

JAMES E. ROGAN
*Director of the United States Patent and Trademark Office*